(12) United States Patent
Nogier (10) Patent No.: US 10,492,381 B2
(45) Date of Patent: Dec. 3, 2019

(54) ELECTRICITY GENERATION METHOD ADAPTED TO CROPS

(71) Applicant: SUN'R, Paris (FR)

(72) Inventor: Antoine Nogier, Paris (FR)

(73) Assignee: SUN'R, Paris (FR)

( * ) Notice: Subject to any disclaimer, the term of this patent is extended or adjusted under 35 U.S.C. 154(b) by 251 days.

(21) Appl. No.: 15/128,719

(22) PCT Filed: Mar. 24, 2015

(86) PCT No.: PCT/IB2015/052148
§ 371 (c)(1),
(2) Date: Sep. 23, 2016

(87) PCT Pub. No.: WO2015/145351
PCT Pub. Date: Oct. 1, 2015

(65) Prior Publication Data
US 2017/0126172 A1     May 4, 2017

(30) Foreign Application Priority Data

Mar. 26, 2014 (FR) ..................................... 14 52587

(51) Int. Cl.
*A01G 9/24* (2006.01)
*H02S 20/30* (2014.01)
(Continued)

(52) U.S. Cl.
CPC ............ *A01G 9/243* (2013.01); *F24S 30/425* (2018.05); *F24S 50/40* (2018.05); *H02S 20/10* (2014.12);
(Continued)

(58) Field of Classification Search
CPC ....................................................... A01G 9/243
(Continued)

(56) References Cited

U.S. PATENT DOCUMENTS

| 7,227,077 | B2* | 6/2007 | Kleinwachter | ...... A01G 9/1438 136/248 |
| 8,119,963 | B2* | 2/2012 | Scanlon | ................. H02S 20/32 250/203.4 |

(Continued)

FOREIGN PATENT DOCUMENTS

| CH | 706132 | 8/2013 |
| DE | 102013002825 | 8/2014 |

(Continued)

OTHER PUBLICATIONS

Bartelmuss (WO 2013/056285) English translation (Year: 2013).*
(Continued)

*Primary Examiner* — Magdalena Topolski
(74) *Attorney, Agent, or Firm* — Pearne & Gordon LLP (57) ABSTRACT

An electricity generation method using orientable photovoltaic sensors disposed above crops, a shadow projected onto the crops being altered by changes in an orientation of the sensors. The orientation of the sensors is controlled in a computerized and automatic manner in order to affect microclimatic conditions of the crops by changing the orientation of the sensors, in particular in order to place crops in microclimatic conditions more suited to obtaining a desired agricultural result, while seeking to achieve an optimum, reducing electricity generation as little as possible in relation to a reference that is not combined with crops.

26 Claims, 3 Drawing Sheets

(51) Int. Cl.
*F24S 30/425* (2018.01)
*H02S 20/10* (2014.01)
*F24S 50/40* (2018.01)
*F24S 30/00* (2018.01)

(52) U.S. Cl.
CPC .......... *H02S 20/30* (2014.12); *F24S 2030/14* (2018.05); *F24S 2201/00* (2018.05); *Y02A 40/266* (2018.01); *Y02E 10/47* (2013.01); *Y02P 60/124* (2015.11)

(58) Field of Classification Search
USPC ............................. 250/203.1, 203.3, 203.4
See application file for complete search history.

(56) References Cited

U.S. PATENT DOCUMENTS

| | | | | |
|---|---|---|---|---|
| 8,156,685 | B2* | 4/2012 | Kleinwaechter | A01G 9/1438 47/17 |
| 8,915,015 | B1* | 12/2014 | Augspurger | A01G 9/14 47/17 |
| 9,509,247 | B1* | 11/2016 | Hinson | H02S 20/23 |
| 9,781,884 | B1* | 10/2017 | Iwai | A01G 22/00 |
| 2005/0091916 | A1* | 5/2005 | Faris | A01G 9/243 47/39 |
| 2005/0109384 | A1* | 5/2005 | Shingleton | F24J 2/04 136/244 |
| 2006/0030990 | A1* | 2/2006 | Anderson | G06Q 10/00 701/50 |
| 2008/0148631 | A1 | 6/2008 | Wan | |
| 2010/0089433 | A1* | 4/2010 | Conger | F24S 25/50 136/244 |
| 2010/0263660 | A1 | 10/2010 | Thorne | |
| 2010/0314509 | A1* | 12/2010 | Conger | H01L 31/042 248/121 |
| 2011/0315197 | A1* | 12/2011 | Angoli | H02S 20/32 136/246 |
| 2013/0153673 | A1* | 6/2013 | Younis | A01G 25/165 239/1 |
| 2015/0107152 | A1* | 4/2015 | Kobland | A01G 1/001 47/58.1 R |
| 2015/0316639 | A1* | 11/2015 | Russ | H02S 20/00 250/203.4 |
| 2018/0240200 | A1* | 8/2018 | Wang | G06Q 10/04 |
| 2018/0248509 | A1* | 8/2018 | Dayama | H02S 40/22 |
| 2018/0263194 | A1* | 9/2018 | Pilebro | A01G 9/246 |

FOREIGN PATENT DOCUMENTS

| | | | |
|---|---|---|---|
| FR | 2889787 | 2/2007 | |
| FR | 3019883 A1 * | 10/2015 | ............ H02S 20/32 |
| WO | 2011047828 | 4/2011 | |
| WO | 2013056285 | 4/2013 | |

OTHER PUBLICATIONS

International Search Report dated Jun. 18, 2015 for PCT/IB2015/052148.
Movellan, Junko. "Japan Next-Generation Farmers Cultivate Crops and Solar Energy", Renewable Energy World Oct. 10, 2013. http://www.renewableenergyworld.com/articles/2013/10/japan-next-generation-farmers-cultivate-agriculture-and-solar-energy.html.
English translation of Cauvin, Brigitte. "Manger et s'éclairer," INRA Magazine, No. 22, Oct. 2012. p. 30-31. http://inra.dam.front.pad.brainsonic.com/ressources/afile/227808-070ba-resource-intra-magazine-no22.html.

* cited by examiner

ELECTRICITY GENERATION METHOD ADAPTED TO CROPS

FIELD OF THE INVENTION

The present invention relates to the generation of electrical power using photovoltaic collectors.

BACKGROUND OF THE INVENTION The generation of electrical power of photovoltaic origin has undergone substantial development.

In certain geographical zones, collectors may be installed without adversely affecting the extent of cultivatable zones.

In other zones, the installation of collectors takes place to the detriment of cultivatable areas.

Trials have been carried out with the aim of reconciling the generation of electricity and the preservation of cultivatable extents.

It has thus been proposed in the article "Japan Next-Generation Farmers Cultivate Crops and Solar Energy", Renewable Energy world 10 Oct. 2013, to cultivate plants in the zones affected by the shadow cast on the ground by collectors.

The publication "Combining Solar photovoltaic panels and food crops for optimising land use: Towards new agrivoltaic schemes", Renewable Energy 36 (2011)2725-2732 reports the results of comparative trials carried out in the south of France, showing the beneficial effect of the shade provided by the panels on crops.

The thesis entitled "Produire des aliments ou de l'énergie: faut-il vraiment choisir?" presented by Hélène Marroux on 18 Dec. 2012 (Sup Agro Montpellier) suggests adjusting the inclination of the collectors during a period of the year to stimulate the productivity of the crops. The use of panels that are translationally or rotationally movable to increase the uniformity over time of the amount of radiation received by each section of the land cultivated in the shadow of the panels is also described.

The publication WO 2011/047828 A1 discloses an installation including solar panels able to adopt a particular orientation in case of rain, in order to facilitate the collection of water with a view to its use in the irrigation of crops.

Patent application US 2008/0148631 A1 discloses a method for combating desertification using pivotably controlled solar panels to create shade during the day and to facilitate the retention of moisture in the soil during the night.

This publication makes no provision for precisely controlling the orientation of the panels with the aim of optimizing the photovoltaic generation and/or the growth of plants.

Patent application CH 706132 describes an installation for generating electrical power using electrical power generation using solar panels placed above crops, in particular vines. The panels are supported by poles that also serve to attach the wires that support the vine.

The solar panels may be at least partially transparent in order to minimize the effect of shade on the crops.

The panels may be placed so as to optimize the solar generation during some of the year and to optimize the quality of the agricultural production the rest of the year.

There is a need to further improve existing systems allowing plants to be grown and electrical power to be generated.

BRIEF SUMMARY OF THE INVENTION

The invention meets this need by virtue of a method for generating electrical power using orientable photovoltaic collectors placed above crops, the shadow projected onto the crops being modified by the change of orientation of the collectors, this method being characterized in that the orientation of the collectors is automatically controlled by computer, so as to act on the microclimatic conditions of the crops by way of a change of orientation of the collectors, especially in order to place the crops under microclimatic conditions that are more favorable to the obtainment of a sought-after agricultural result while seeking to achieve an optimum decreasing as little as possible the generation of electrical power with respect to a reference without combination with crops.

Preferably, the orientation of the collectors is automatically controlled by computer on the basis at least of data representative of the local environmental conditions of the crops, especially the temperature of the crops, the instantaneous insolation, the moisture content of the soil and/or rainfall.

The invention allows the presence of solar collectors to be optimally exploited to ensure crops benefit from an insolation that varies depending on their need for light and/or heat and/or to control hydric stress.

Thus, the presence of solar collectors is not an obstacle to growing plants but in contrast an opportunity. For example, the orientation of the collectors may be controlled so as to automatically prevent, during a heatwave, the plants from being subjected to excessive heat. In contrast, in the spring, the orientation may be controlled so as to automatically maximize heating of the soil, including at night by reflection of the infrared light emitted by the soil, in order to promote germination.

Preferably, the orientation of the collectors is modified by electrical actuators, such as electromechanical cylinders for example. The power used by the actuators may have been delivered by the collectors.

The invention allows agricultural production to be improved with respect to a crop in full sunlight, or a reference yield, and more electrical power to be generated then with collectors the orientation of which is not modifiable using actuators.

The orientation of the collectors may be modified according to a control law seeking to obtain a qualitative and/or quantitative maximum. For example in the case of market-farming crops, the collectors may be oriented using an algorithm for automatically controlling the orientation of the collectors, aiming to prevent excessive heating of the leaves. The presence of the collectors may thus be capitalized on to adequately intercept light in order to optimize photosynthesis and obtain a production yield higher than it would be in the complete absence of shade. In the case of viticulture, the orientation of the collectors may be chosen depending on the sugar content sought in the grape, and in fine on the quality of the obtained wine.

The orientation of the collectors may be controlled depending on a target amount of light energy to be achieved, this target amount of light energy especially being dependent on the need of the crops, on the energy deficit or surplus of the previous day or the preceding days, and/or on the weather forecast.

Preferably, the orientation of the collectors is modified depending on meteorological data and especially i) on at least a crop insolation history and a history of the heat received by the crops, and/or a rainfall history and ii) on an objective set for the current day, for an amount of insolation, heat and/or rainfall to be received by the plant and on temperature limits not to be exceeded. This history may be compiled locally, by virtue of local detection of temperature, insolation, rainfall and/or the moisture content of the soil. For example, if the insolation of the preceding days is considered to meet the needs of the crops for light and/or heat over a given period, the collectors may be oriented at each instant so as to meet the objectives of the day, while privileging the generation of electricity. If in contrast the insolation of the preceding days is considered to insufficiently meet the needs of the crops for light and/or heat, then the collectors are oriented so as to privilege the need of the crops for insolation. In this case, the orientation of the collectors need not optimize the generation of electricity as a function of the position of the sun.

Apart from the geographical position and inclination of the installations, the computational control of the collectors is preferably carried out according to a control law specific to each variety of cultivated plant.

Among the parameters that will possibly be considered when selecting the control law from a library of pre-established control laws, and/or when adapting a control law to the pursuit of a predefined agricultural result, may feature the cultivated variety, and quantitative or qualitative criteria, such as a sought maximum agricultural production or a particular quality of the cultivated plant.

The collectors may be oriented in the evening or during the night so as to maximally or minimally reflect toward the ground the thermal radiation of the soil, during the night, in order to regulate the temperature of the soil (i.e. to heat or cool it). The orientation of the collectors at night may for example be controlled depending on the observed or forecast atmosphere-ground temperature gradient, and depending on the pursued objective (cooling or heating of the soil). For example, if there is a need to cool the soil and the atmosphere-ground gradient is negative (the ground is hotter than the air), the collectors may be oriented perpendicularly to the ground. Thus, before each modification of the orientation of the collectors, it may be determined whether the electrical power consumption required to make this modification is necessary with regard to the expected benefit vis-à-vis the crops.

The method advantageously includes measuring the temperature level with the crops and controlling the orientation of the collectors at least depending on the measured temperature.

The solar collectors may be placed in parallel spaced-apart rows. The collectors are preferably orientable about a single axis of rotation, which is preferably horizontal.

The axis of rotation may be aligned with the north-south direction or as a variant make an angle thereto.

The orientation of the collectors advantageously depends on the state of development of the crops. Thus, during the winter, the orientation may be controlled so as to heat the soil at the end of the winter period, in order to promote germination.

The orientation of the collectors is preferably controlled so as to keep the crops in a preset maximum and/or minimum temperature range. Thus, during hot periods, the orientation of the panels may correspond to a maximum production of shade on the ground.

Yet another subject of the invention is a system for generating electrical power, including:
  a bearing structure,
  orientable solar collectors maintained a nonzero distance away from the ground by the bearing structure and especially at a height comprised between 3 and 5 m,
  one or more actuators for modifying the orientation of the solar collectors and the shadow cast on the ground, and
  a computer for automatically determining the orientation to give to the collectors depending on the need of the crops affected by the shadow cast by the collectors as regards insolation, temperature and rainfall.

The system may include a temperature sensor informing the computer of the local temperature level with the crops.

The computer may be arranged to determine the orientation of the collectors depending on an insolation and/or rainfall history and/or the state of development of the crops.

The computer may be local, in which case the orientation of the collectors may be determined autonomously by the computer.

The computer may also, as a variant, be at least partially remote i.e. at least partially contained in the command-control center of the device.

The structure supporting the collectors may advantageously be used in order to deploy a netting above the crops. This netting may have four functions:
  To protect the crops from hail, this being done in response to a weather forecast
  To protect the crops from animal attacks
  To increase the shade on the crops, the choice of the occulting power of the netting being made depending on an identified need of the crop for light, an insolation history and/or an insolation forecast.
  To participate in the control of the night-time microclimate above the crop by acting on the heat and moisture transfer with the exterior environment, the netting being deployed depending on an identified thermal and/or hydric need of the crop, a hydric and/or thermal and/or light history of the crop, on a measurement of the hydric and/or thermal state of the crop, and/or on a weather forecast.

The deployment and the control of this netting may be carried out automatically by computer or manually, the electrical power required by this operation possibly being generated by the specific generation capacity of the collectors or coming from the mains if the installation is connected thereto.

This protecting system may be deployed in case of a warning of hail, above the crops. The collectors may then be positioned in a configuration of least exposure to the hailstones, for example as vertically as possible.

Yet another subject of the invention is a method for growing plants, wherein the plants are cultivated so as to be affected by the shadow cast on the ground by the collectors of a system according to the invention, i.e. a system such as defined above.

This cultivation is carried out in an open system, without control of moisture, temperature and/or wind variables other than through a modification of the orientation of the collectors.

The orientation of the collectors may be modified every day or better still every hour.

The collectors are controlled not just to simply track the course of the sun, during periods in which the orientation of the collectors is chosen to meet the needs of the crops.

The control law of the orientation of the collectors may especially be based on the stress level of the crop. A stress model evaluates this criterion for example depending on a insolation and/or temperature history of the crop, and on a measurement of the foliar temperature of the crop. The input and output parameters usable by this stress model are not limited to the aforementioned parameters.

Yet another subject of the invention, independently or in combination with the above, is a method for growing plants, wherein orientable occulting elements are placed above the crops, the shadow projected onto the crops being modified by the change of orientation of the occulting elements, this method being characterized in that the orientation of the occulting elements is automatically controlled by computer, preferably on the basis at least of data representative of the local environmental conditions of the crops, in order to act on the microclimatic conditions of the crops by way of a change of orientation of the occulting elements and especially in order to place the crops under microclimatic conditions that are more favorable to the obtainment of a sought-after agricultural result. According to this aspect of the invention, the occulting elements may be photovoltaic collectors such as defined above, or be relatively opaque panels not having a photovoltaic function.

The orientation of the occulting elements may be modified according to a control law seeking to obtain a qualitative and/or quantitative maximum. For example in the case of market-farming crops, the occulting elements may be oriented using an algorithm for automatically controlling the orientation of the occulting elements, aiming to prevent excessive heating of the leaves. The presence of the occulting elements may thus be capitalized on to adequately intercept light in order to optimize photosynthesis and obtain a production yield higher than it would be in the complete absence of shade. In the case of viticulture, the orientation of the occulting elements may be chosen depending on the sugar content sought in the grape, and in fine on the quality of the obtained wine.

The orientation of the occulting elements may be controlled depending on a target amount of light energy to be achieved, this target amount of light energy especially being dependent on the need of the crops, on the energy deficit or surplus of the previous day or the preceding days, and/or on the weather forecast.

Preferably, the orientation of the occulting elements is modified depending on meteorological data and especially i) on at least a crop insolation history and a history of the heat received by the crops, and/or a rainfall history and ii) on an objective set for the current day, for an amount of insolation, heat and/or rainfall to be received by the plant and on temperature limits not to be exceeded. This history may be compiled locally, by virtue of local detection of temperature, insolation, rainfall and/or the moisture content of the soil.

The computational control of the occulting elements is preferably carried out according to a control law specific to each variety of cultivated plant.

Among the parameters that will possibly be considered when selecting the control law from a library of pre-established control laws, and/or when adapting a control law to the pursuit of a predefined agricultural result, may feature the cultivated variety, and quantitative or qualitative criteria, such as a sought maximum agricultural production or a particular quality of the cultivated plant.

The occulting elements may be oriented in the evening or during the night so as to maximally or minimally reflect toward the ground the thermal radiation of the soil, during the night, in order to regulate the temperature of the soil (i.e. to heat or cool it). The orientation of the occulting elements at night may for example be controlled depending on the observed or forecast atmosphere-ground temperature gradient, and depending on the pursued objective (cooling or heating of the soil). For example, if there is a need to cool the soil and the atmosphere-ground gradient is negative (the ground is hotter than the air), the occulting elements may be oriented perpendicularly to the ground. Thus, before each modification of the orientation of the occulting elements, it may be determined whether the electrical power consumption required to make this modification is necessary with regard to the expected benefit vis-à-vis the crops.

The cultivating method advantageously includes measuring the temperature level with the crops and controlling the orientation of the occulting elements at least depending on the measured temperature.

The occulting elements may be placed in parallel spaced-apart rows.

The occulting elements are preferably orientable about a single axis of rotation, which is preferably horizontal.

BRIEF DESCRIPTION OF THE DRAWINGS

The invention will possibly be better understood on reading the following detailed description of nonlimiting examples of implementation thereof, and on examining the appended drawings, in which.

DESCRIPTION OF EXAMPLE EMBODIMENTS

Figure 1:
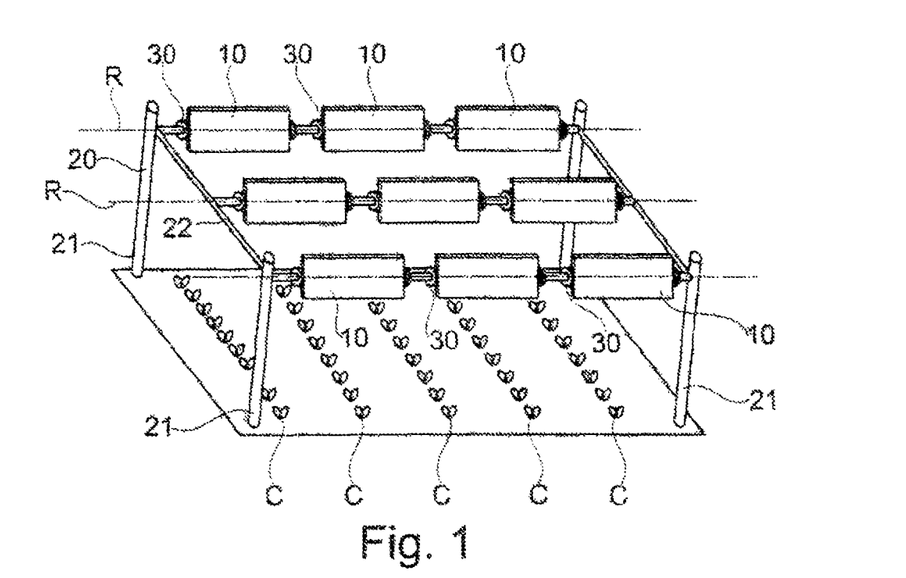
FIG. 1 schematically shows a system for generating electrical power according to the invention, FIG. 2 schematically shows a system for controlling the orientation of a solar collector according to the invention, FIG. 3 schematically shows the variation over time of the light energy received by the crops and collectors.

FIG. 1 shows a system for generating electricity according to the invention, including a plurality of solar collectors 10 that are movable about respective axes of rotation R. These collectors 10 are held by a bearing structure 20, allowing a sufficient height to be provided under the collectors 10 for the passage of agricultural machines, in particular a height comprised between 3 and 5 m.

The bearing structure 20 includes poles 21 that support a framework 22 to which the collectors 10 are hinged.

Each collector 10 is pivoted about the corresponding axis R using at least one actuator 30.

The actuators 30 are for example provided individually for each collector 10, as illustrated. As a variant, one and the same actuator 30 may rotate a plurality of solar collectors 10.

The actuators 30 for example each include one or a plurality of electrical motors, and for example consist of servomotors.

The crops C are placed in the shadow projected on the ground by the collectors 10. The crops C may be of any type and may for example be market-farming crops or vines.

Figure 2:
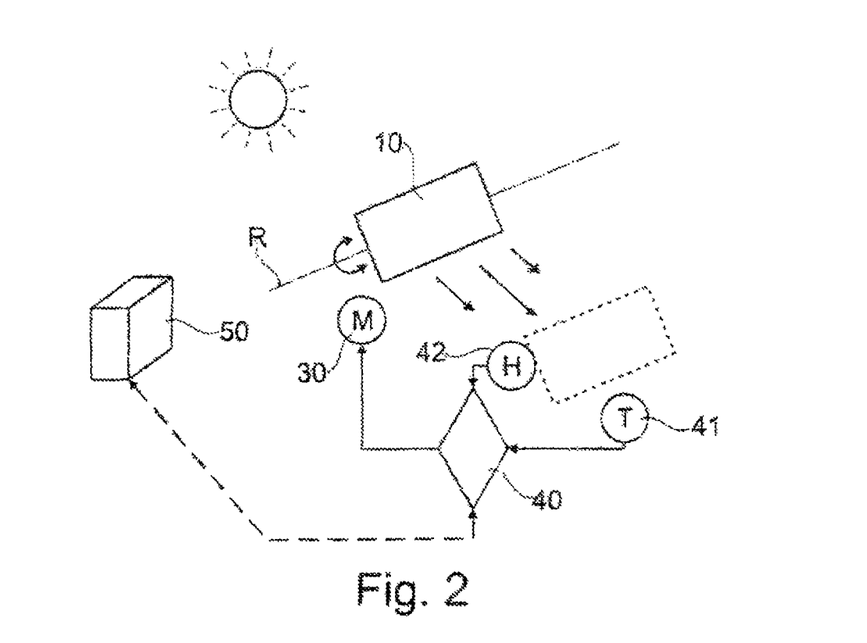

If the reader refers to FIG. 2, it may be seen that the position to give to the collectors 10 may be determined by a local computer 40 that is connected via any suitable power interface to the actuators 30.

The computer 40 preferably receives information from one or more local probes, for example a temperature probe 41 placed level with the crops C and a moisture probe 42 placed in the soil level with the crops C. Other sensors may be added, such as a rain gauge, an anemometer and/or a video camera for viewing the state of development of the crops, and one or more biosensors where appropriate.

It is particularly advantageous, generally, to use a contactless infrared sensor to measure the temperature of the crops. Thus an infrared video camera that is pointed at the crops in various locations and that allows a spatially averaged temperature to be calculated may be used.

The computer 40 may also exchange data, for example via a wireless telephone network, with a remote server 50, which may for example inform the computer 40 of the weather to come.

The computer 40 may be produced on the basis of any microprocessor or piece of computational equipment allowing the orientation of the collectors 10 to be controlled according to one or more control laws giving the orientation to be imposed on the collectors depending on the place, on the date, on the time and on a number of other parameters related to the crops C.

The computer 40 may thus include a processing unit and a local memory in which the measured local data, for example temperature, moisture-content and rainfall data, may be recorded in order to keep the history of the environmental conditions of the crops.

The memory of the computer may also include automatic control parameters that govern the orientation of the collectors depending on the needs of the crops. These parameters may vary over time and, depending for example on the season, may privilege the insolation of the crops.

The one or more control laws may be programmed into the computer 40 from the start, or as a variant be downloaded by the computer 40 from the remote server 50, or else be updated periodically by the remote server 50.

In one exemplary embodiment, the computer 40 operates autonomously. Depending on the season, on the sowing date and optionally on other parameters input by the farmer, it controls automatically and daily the orientation of the collectors 10 so as to meet the need of the crops with regard to insolation, temperature, moisture content and rainfall over a given period of time. In this case, the collectors are for example oriented during a fraction of the day to let as much light as possible pass, to the detriment of the generation of electricity. Next, once the need for insolation has been met, the collectors are brought by activating the actuators to an orientation aiming to maximize the generation of electricity.

However, if the local temperature measured level with the crops is excessive, or higher than the set objective, the orientation of the collectors may be modified to shelter the crops from the sun and prevent excessive heating.

In one variant embodiment, the computer 40 receives collector control instructions from the remote server 50, to which it may for example transmit local temperature and insolation data, and data relating to the crops and their stage of development. The server 50 in return transmits to the computer information relating to the orientation to give to the collectors, in real time or over a certain period to come.

When the collectors 10 are oriented to maximize the generation of electricity, they may follow in real-time the course of the sun from east to west.

Figure 3:
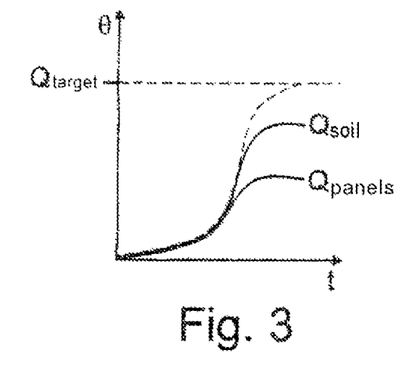

FIG. 3 shows the variation in the light energy received over time, for the collectors and crops. When the collectors follow the course of the sun, they receive about one third of the light energy. The crops receive two thirds thereof. It is possible to increase the amount of energy received by the crops by modifying the orientation of the collectors so as to decrease the occultation of the crops.

A target amount of energy may be set in advance for a day j depending on the light energy needed by the crops, on the energy deficit or surplus received the previous day or the preceding days, and on weather forecasts allowing the amount of energy expected for this day j to be estimated.

Where appropriate, the model that sets the target amount of energy is more elaborate and takes into account the cost of electricity or its potential market value.

The dashed line in FIG. 3 shows the variation over time in the energy received until it reaches the target quantity. To achieve this, the energy received by the crops is increased while decreasing that $Q'_{collectors}$ received by the collectors to the benefit of a lesser occultation of the crops.

Figure 4:
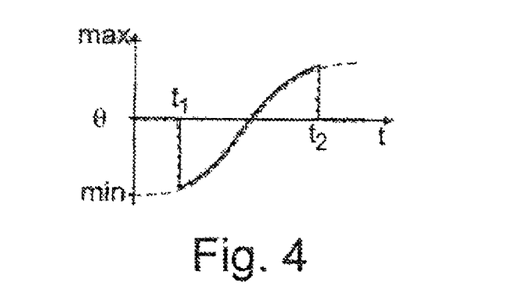
FIGS. 4 to 7 illustrate examples of control of the collectors as a function of time.

FIG. 4 shows the variation in the angle of the collectors over time. The dashed curve corresponds to a conventional tracking of the course of the sun.

To increase the light energy received by the crops, it is possible to leave the collectors horizontal between sunrise and t1, then after t2 until sunset. Between t1 and t2, the collectors are oriented so as to track the course of the sun.

Leaving the panels horizontal does not minimize the occultation but makes it possible not to consume electricity orienting them.

Figure 5:
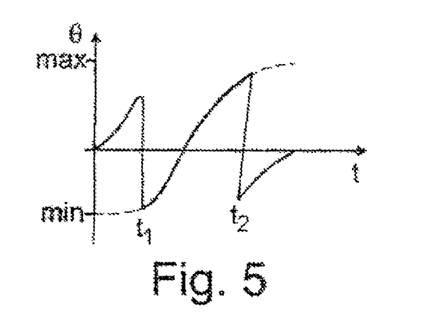

In the variant illustrated in FIG. 5, between sunrise and t1 the orientation of the collectors is modified to let a maximum of light pass to the crops, and likewise after t2 up to sunset.

Figure 6:
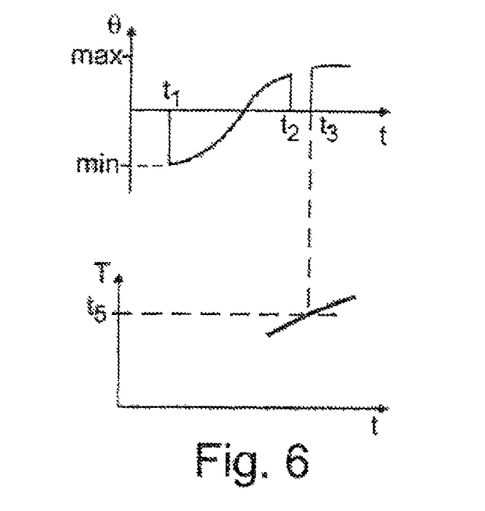

In FIG. 6 it may be seen that the collectors are controlled as in the example in FIG. 4. However, between t2 and t3 the sun is once again tracked in order to allow the crops to benefit from a maximum occultation in order to protect the latter from an excessive temperature. In this example, the temperature of the crops is monitored, for example by virtue of an infrared video camera. It is assumed in this example that the temperature exceeded a limiting value at the time t3. The system controlling the panel thus triggered the passage to a sun tracker mode from t3 to sunset.

Figure 7:
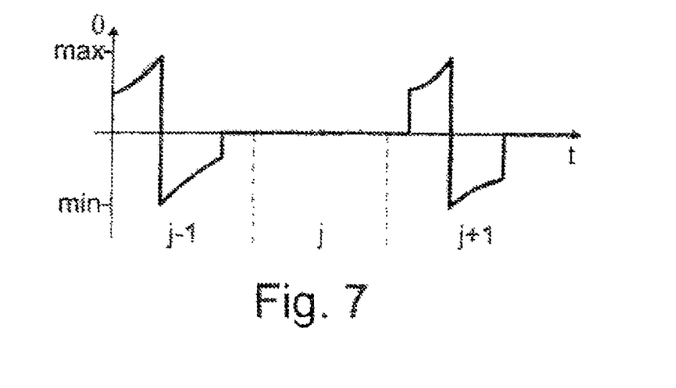

FIG. 7 shows an example of the variation in the angular travel of the collectors at the end of the winter period.

It may be seen in this figure that the collectors are oriented during the day j−1 to minimize occultation, by orienting them substantially parallel to the sun's rays over time.

If the weather forecast has predicted that on day j it will be cold and overcast, the collectors may be kept horizontal during the day and night so as to maximally reflect infrared from the ground toward the crops. On day j+1, the collectors are controlled in a way similar to that of the day j−1.

The target amount of energy for the day j+1 may be calculated from the amount of light energy actually received by the crops on day j and, optionally, the prior days. To determine the amount of light energy actually received, it is possible to use a pyrheliometer or pyranometer. Better still, this energy is calculated from that received by the collectors, knowing their orientation and that of the sun and using a mathematical model that gives the average energy at the ground taking into account the occultation provided by the collectors.

Figure 8:
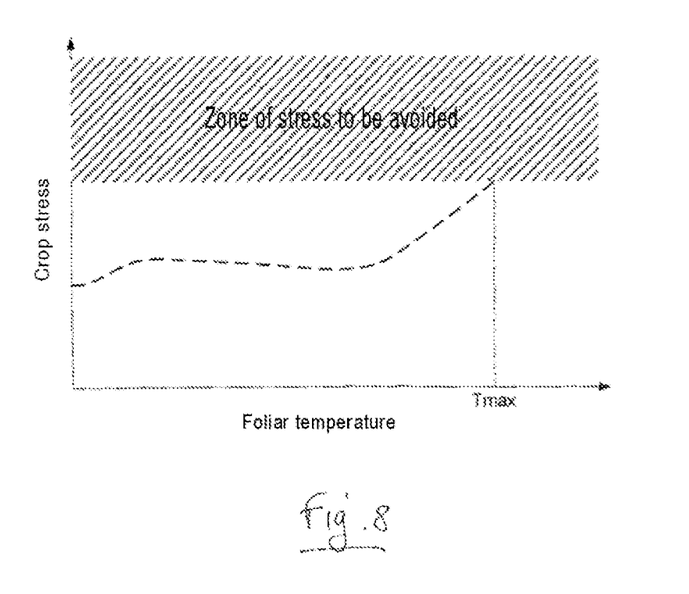
FIG. 8 is a simplified representation of a crop stress model based on foliar temperature.

FIG. 8 is a simplified representation of crop stress level based on foliar temperature. This curve shows that in order to meet a maximum crop stress criterion the control system may seek to keep the foliar temperature in an interval comprised between Tmin and Tmax by acting on the orientation of the collectors.

Of course the invention is not limited to the examples just described.

For example, the collectors use may be placed so as to be orientable about two axes of rotation.

Figure 9:
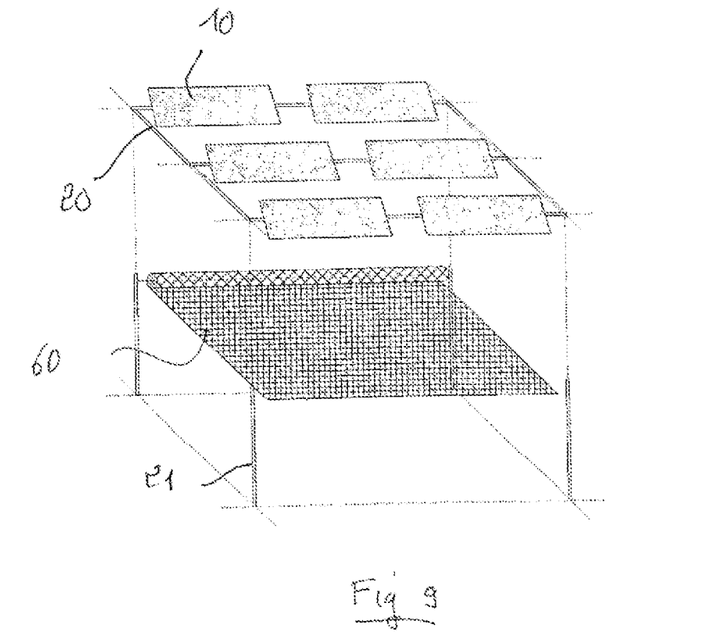
FIG. 9 is an view analogous to FIG. 1 of a variant embodiment.

FIG. 9 illustrates that it is possible to use the bearing structure 20 to support a system providing protection 60 against bad weather, especially hail, and for example taking the form of a netting that is deployed between the poles 21 of the structure 20. This deployment may be automated where appropriate, by virtue of permanently present cables that are stretched between the poles 21. It is possible in this case not to use the collectors to protect the crops during periods of bad weather, and to orient them for example so as to minimize the risk of them being damaged.

In one variant implementation of the invention, more particularly relating to the optimization of the yield of the agricultural production independently of the generation of electricity, the collectors are replaced by occulting elements such as sheet-metal or composite panels that may optionally be apertured.

The expression "including a" must be understood as being synonymous with "comprising at least one" unless specified otherwise.

The invention claimed is:

1. A method for generating electrical power using orientable photovoltaic collectors placed above crops, a shadow projected onto the crops being modified by a change of orientation of the photovoltaic collectors, the method comprising:
   determining, by way of a processing unit of a computer, an initial orientation of the photovoltaic collectors, wherein when the photovoltaic collectors are placed in the initial orientation, an optimum production of electrical power is yielded;
   acquiring current data representative of current local environmental conditions comprising at least one of a temperature of the crops, a moisture content of soil, and rainfall, and storing the current data in a memory of the computer;
   recalling, from the memory of the computer, historical data previously stored in the memory of the computer and representative of historical crop insolation and historical rainfall occurring over the preceding days;
   determining, by way of the processing unit of the computer, a final orientation of the photovoltaic collectors based on the current data and the historical data, wherein when the photovoltaic collectors are placed in the final orientation, an actual production of electrical power deviates as little as possible from the optimum production of electrical power; and
   adjusting an orientation of the photovoltaic collectors to the final orientation.

2. The method as claimed in claim 1, the photovoltaic collectors being oriented in an evening so as to maximally or minimally reflect toward a ground a thermal radiation of the soil during nighttime.

3. The method according to claim 2, wherein the photovoltaic collectors are positioned horizontally.

4. The method as claimed in claim 1, further comprising measuring the temperature of the crops, the orientation of the photovoltaic collectors being controlled at least depending on the temperature measured.

5. The method as claimed in claim 1, the photovoltaic collectors being placed in parallel spaced-apart rows.

6. The method as claimed in claim 1, the photovoltaic collectors being orientable about a single axis of rotation.

7. The method according to claim 6, wherein the photovoltaic collectors are substantially parallel to a north south direction.

8. The method as claimed in claim 1, the crops being vines.

9. The method as claimed in claim 1, the crops being market-farming crops.

10. The method as claimed in claim 1, the final orientation of the photovoltaic collectors being further determined on a state of development of the crops.

11. The method as claimed in claim 1, the final orientation of the photovoltaic collectors being further determined so as to keep the crops in at least one of a preset maximum temperature range and a preset minimum temperature range.

12. The method as claimed in claim 1, the final orientation of the photovoltaic collectors being further determined on a target amount of light energy to be achieved.

13. The method as claimed in claim 1, the final orientation of the photovoltaic collectors being further determined so as to keep the crops in a state of minimum stress by recourse to a crop stress model.

14. The method as claimed in claim 1, a structure supporting the photovoltaic collectors being used in order to deploy a netting above the crops with an aim of at least one of a protection of the crops from hail, this protection from hail being in connection with a weather forecast, protection of the crops from animal attacks, an increase of the shade on the crops, and a participation in a control of a night-time microclimate above the crop by acting on a heat and moisture transfer with an exterior environment, the netting being deployed depending on at least one of an identified thermal or hydric need of the crop, a hydric or thermal or light history of the crop, and a measurement of a hydric or thermal state of the crop.

15. The method according to claim 14, wherein a choice of an occulting power of the netting is made depending on an identified need of the crops for at least one of light, the historical crop isolation history, and an isolation forecast.

16. The method according to claim 14, an electrical power required for deploying and controlling the netting being generated by a specific generation capacity of the photovoltaic collectors or coming from mains if the installation is connected thereto.

17. The method according to claim 1, wherein the final orientation of the photovoltaic collectors is aimed at placing the crops under microclimatic conditions that are more favorable to obtaining a sought agricultural result.

18. A system for generating electrical power, including:
   a bearing structure;
   orientable solar collectors maintained a distance away from crops in a ground by the bearing structure;
   one or more actuators for modifying an orientation of the solar collectors and a shadow cast on the ground by the solar collectors; and
   a computer for automatically determining an initial orientation to give to the solar collectors at which an optimum production of electrical power is yielded, and a final orientation to give to the solar collectors, the final orientation being dependent on an insolation need of the crops affected by the shadow cast on the ground by the solar collectors, and further being dependent on historical crop insolation history and historical rainfall history occurring over the preceding days, wherein when the solar collectors are in the final orientation an actual production of electrical power deviates as little as possible from the optimum production of electrical power.

19. The system as claimed in claim 18, further including a temperature sensor informing the computer of a local temperature level with the crops.

20. The system according to claim 19, wherein the temperature sensor is an infrared video camera.

21. The system as claimed in claim 18, the computer being further arranged to determine the final orientation of the solar collectors depending further on a state of development of the crops.

22. The system as claimed in claim 18, the computer being local.

23. The system as claimed in claim 22, the final orientation of the solar collectors being determined autonomously by the computer.

24. The system as claimed in claim 18, the computer being at least partially remote.

25. A method for growing plants using the system of claim 18, wherein the plants are cultivated so as to be affected by the shadow cast on the ground by collectors.

26. A method for growing plants using the system of claim 18, wherein orientable occulting elements are placed above the crops, the shadow cast on the ground being modified by a change of orientation of the occulting elements, wherein an orientation of the occulting elements is automatically controlled by the computer on the basis of data representative of local environmental conditions of the crops, in order to act on microclimatic conditions of the crops by way of the change of orientation of the occulting elements.

* * * * *